United States Patent [19]

Lagoni et al.

[11] 4,173,023

[45] Oct. 30, 1979

[54] BURST GATE CIRCUIT

[75] Inventors: William A. Lagoni, Indianapolis, Ind.; James B. Webb, Cincinnati, Ohio

[73] Assignee: RCA Corporation, New York, N.Y.

[21] Appl. No.: 908,561

[22] Filed: May 24, 1978

[51] Int. Cl.² .............................................. H04N 9/46
[52] U.S. Cl. ....................................... 358/20; 307/253
[58] Field of Search ..................... 358/19, 20; 307/239, 307/248, 253

[56] References Cited

U.S. PATENT DOCUMENTS

| | | | |
|---|---|---|---|
| 2,840,703 | 6/1958 | Dobson | 250/27 |
| 2,905,748 | 9/1959 | Phillips | 178/5.4 |
| 3,125,691 | 3/1964 | Astheimer | 307/273 X |
| 3,130,327 | 4/1964 | Krossa et al. | 307/273 X |
| 3,654,495 | 4/1972 | Shinoda et al. | 307/293 |

*Primary Examiner*—Robert L. Richardson

*Attorney, Agent, or Firm*—Eugene M. Whitacre; William H. Meagher; Ronald H. Kurdyla

[57] ABSTRACT

A burst gate pulse generating circuit includes a normally saturated transistor responsive to a pulse representative of a horizontal sync component of a video signal which includes a burst interval. The sync pulse is coupled to a base input of the transistor via an RC differentiating network for causing the transistor to operate between saturated and cut-off states, such that a gate pulse produced at the transistor collector output is delayed relative to the sync pulse and substantially coincides with the burst interval. The circuit is arranged so that the sync pulse as coupled via the differentiating network causes the base-emitter junction of the transistor to break down in the reverse direction. The timing of the output gate pulse is therefore substantially independent of the sync pulse amplitude, which can vary undesirably, thereby promoting accurate pulse timing.

13 Claims, 10 Drawing Figures

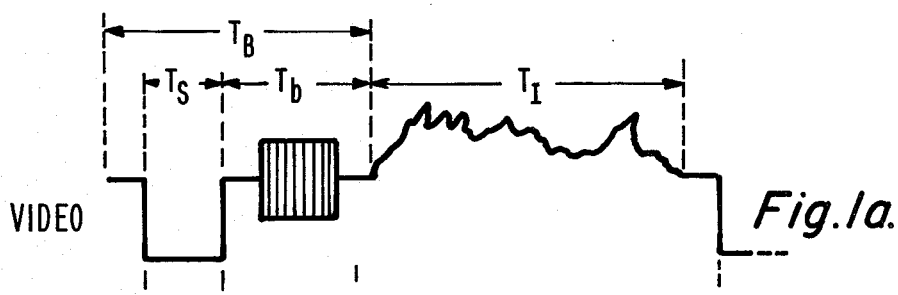
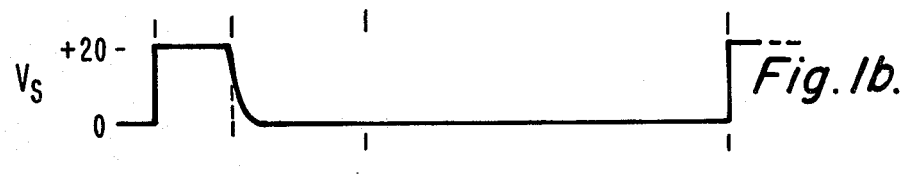
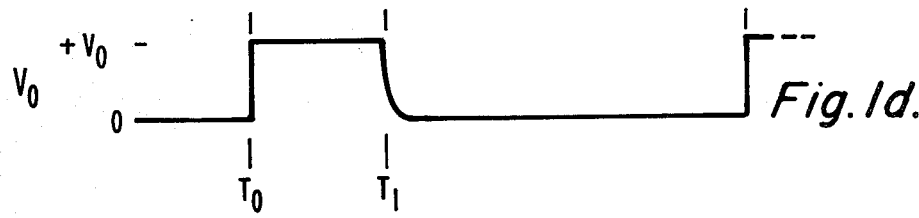
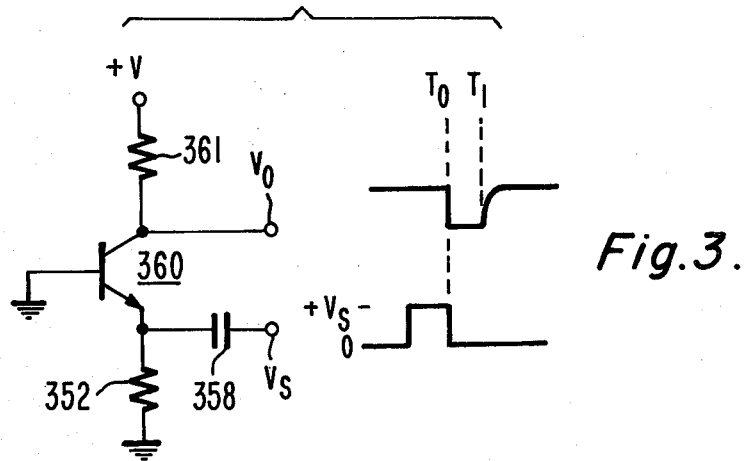

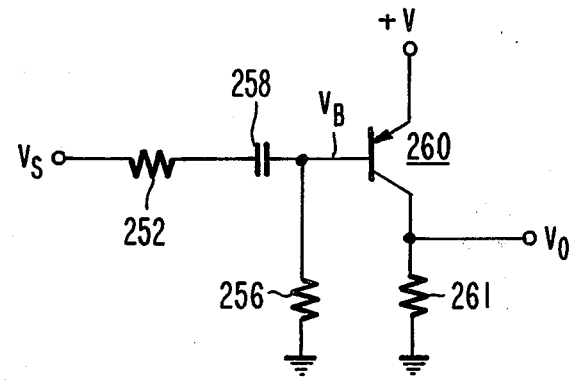
*Fig. 2.*
... *Fig. 2a.*
... *Fig. 2b.*
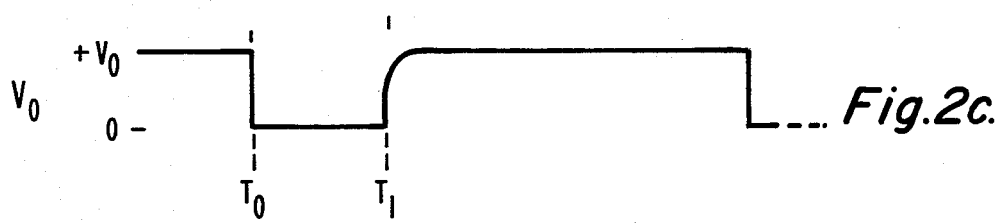
... *Fig. 2c.*

BURST GATE CIRCUIT

This invention relates to a burst gate circuit for developing a gating pulse to separate a color synchronizing burst reference signal from chrominance information of a composite color television video signal. More particularly, the invention concerns a relatively uncomplicated and economical burst gate circuit providing an accurately timed burst gate pulse.

In a color television system such as the NTSC type adopted by the United States, for example, a composite color television video signal includes a chrominance (color) component with color information phase and amplitude modulated on a suppressed color subcarrier of 3.58 MHz, and a luminance (brightness component. The video signal also includes a synchronizing (sync) pulse occurring during a blanking interval, and a color burst reference signal in synchronized relationship with the color subcarrier. The burst component is represented by several cycles of a known phase of the subcarrier signal, and occurs shortly after the horizontal sync pulse during the blanking interval.

In a color television receiver for this system, the burst component is separated from the remainder of the video signal to provide a reference signal of proper phase and frequency for demodulating the color component. It has been customary in separating the burst component to apply to an amplifier only those signal frequencies in the upper portion of the video frequency range containing the burst and chrominance signal frequencies. By periodically gating the amplifier into conduction with gate pulses coincident with the burst interval of the video signal, the burst component is separated to the exclusion of the remainder of the applied signal.

A suitably timed burst gate pulse can be derived from a horizontal line flyback pulse produced by horizontal deflection circuits of the television receiver. However, use of the horizontal sync pulse itself to derive the burst gate pulse is often preferred, since the horizontal sync pulse is already present in the video signal in a fixed time relationship with the burst component. Additionally, the flyback pulse is susceptible to being misplaced relative to the burst interval by adjustment of, for example, the hold control in the horizontal deflection circuit. Adjustment of the horizontal circuit via the hold control may cause an unacceptable change in the timing, amplitude or shape of the flyback pulse such that a portion of the flyback pulse may undesirably occur in time coincidence with some of the video information of the composite signal. In such a case, the gated amplifier will pass not only the burst component but also a portion of the video information. A burst gate pulse derived from the horizontal sync pulse is not affected by adjustment of the horizontal circuit. Circuits of this type for generating burst gate pulses are shown, for example, in U.S. Pat. Nos. 4,051,518; 3,654,495; 2,905,746; and 2,840,703.

Burst gate pulses can be formed by passing the horizontal sync pulses through a suitable delay line, or by employing tuned (reactive) circuits to provide an appropriate delay. Integrating, differentiating and clamping operations have also been used in order to provide an appropriately delayed and shaped burst gate pulse. These approaches, however, suffer from disadvantages of complexity, high cost or inaccuracy.

A burst gate generator circuit desirably should exhibit accurate, predictable performance in order to insure that the burst component can be properly separated to the exclusion of the remainder of the video signal. Otherwise, the remainder of the video signal or an insufficient amount of gated burst will interfere with or compromise the proper operation of the burst-responsive signal processing circuits. Simplicity is also a desirable feature of a burst gate generator circuit, since such a circuit typically can be expected to exhibit enhanced reliability as well as relatively low cost.

In accordance with the invention, a circuit for generating an output pulse in response to an input reference pulse comprises a source of recurring reference pulses, an active semiconductor current conducting device, and a signal translating network. The active device has input, output and common electrodes and a semiconductor PN junction between the input and common electrodes, and is biased to conduct under quiescent conditions. The signal translating network exhibits a given time constant and is coupled to the pulse source and to the input electrode of the active device for producing a translated reference pulse at the input electrode. The translated reference pulse exhibits an amplitude transition of a sense and magnitude such as to cause reverse breakdown of the PN junction, and renders the active device nonconductive for a period determined by the time constant.

In one embodiment of the invention, the circuit is employed to generate a burst gate pulse suitable for use in processing color information contained in a chrominance component of a color televison signal which also includes a horizontal image synchronizing component and a color reference burst component occurring during a burst interval. In this instance, the pulse source provides a periodic reference pulse representative of the horizontal synchronizing component, which is translated by the signal translating network and supplied to the input of the active device. A gate pulse developed at the output of the active device is delayed relative to the input pulse and substantially coincident with the burst interval.

In the drawing:

FIGS. 1a-1d illustrate waveforms useful in understanding the operation of the circuit shown in FIG. 1;

FIG. 2 illustrates an alternate embodiment of a circuit according to the present invention;

FIGS. 2a-2c depict waveforms useful in understanding the operation of the circuit of FIG. 2; and FIG. 3 shows another circuit embodiment of the invention.

Figure 1:
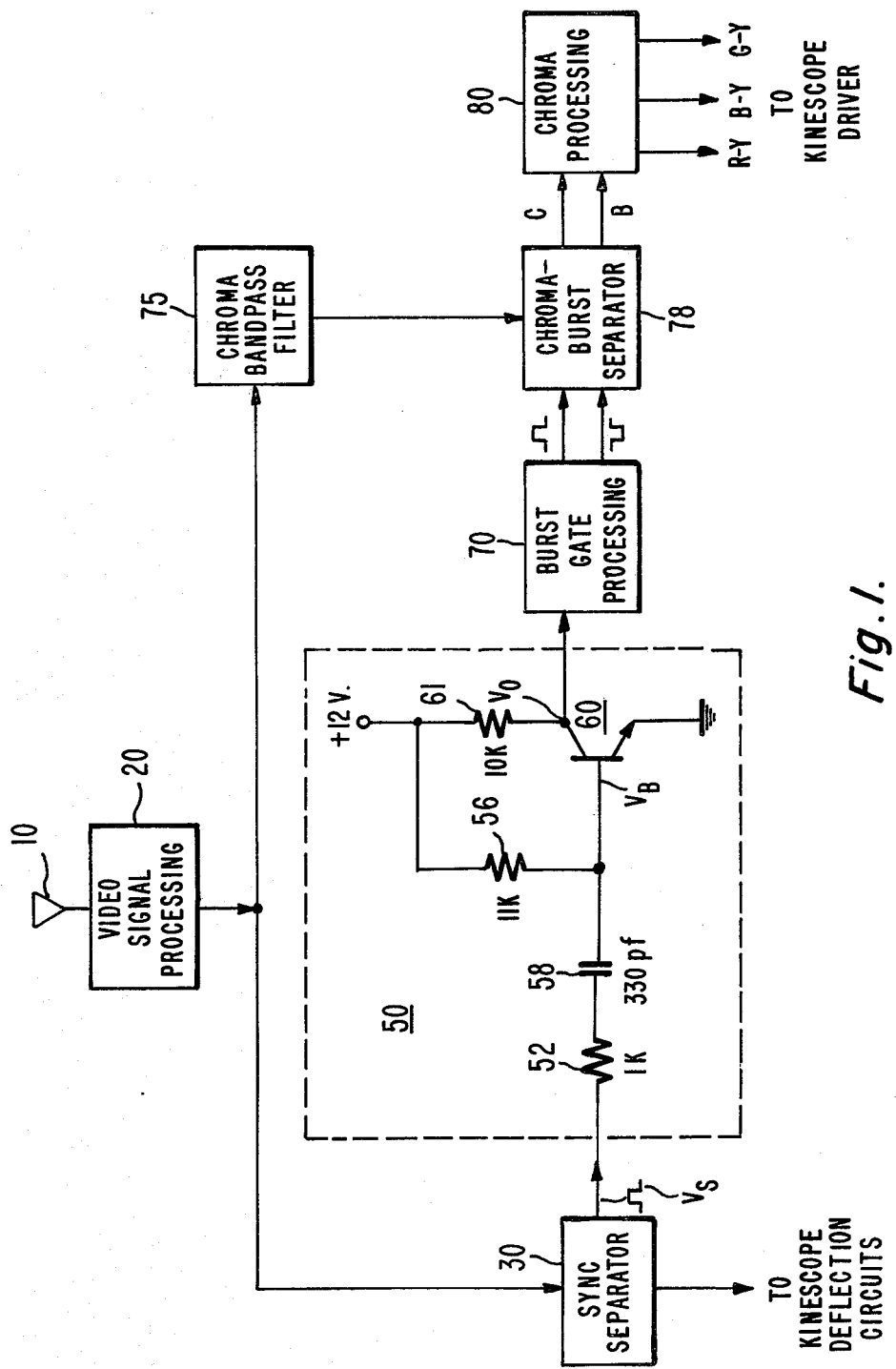
FIG. 1 illustrates a portion of a color television receiver employing a circuit according to the present invention.

In FIG. 1, a video signal processing unit 20 is responsive to radio frequency television signals received by an antenna 10. Video signal processing unit 20 generates a composite video signal comprising chrominance, luminance, sound and synchronizing components by means of suitable intermediate frequency amplifier and detector circuits (not shown).

An output of signal processing unit 20 is coupled to a synchronizing (sync) signal separator 30 for separating horizontal and vertical sync pulses from the video signal. Separated horizontal and vertical sync pulses are applied to deflection circuits of an image reproducing kinescope (not shown). A positive horizontal sync pulse $V_s$ (e.g., of twenty volts peak amplitude) is coupled from an output of sync separator 30 to an input of a burst gate pulse generator 50, which will be described in greater detail subsequently. Burst gate output pulses from circuit 50 are coupled to an input of a burst gate processing unit 70, which in this example develops antiphase (push-pull) burst gate pulses from the output of circuit 50 in conventional fashion.

Video signals from signal processing unit 20 are also coupled to a chroma bandpass filter 75, which selectively passes the relatively higher frequency chrominance component of the video signal. Output signals from bandpass filter 75 and the antiphase burst gate pulses from unit 70 are coupled to respective inputs of a chroma-burst separator 78, which can be of the type described in U.S. Pat. No. 4,038,681 of L. A. Harwood. Separator 78 is keyed by the antiphase burst gate pulses to provide separated chrominance (C) and burst (B) signal components. These separated components are coupled to respective inputs of a chroma processing unit 80, which serves to derive R-Y, B-Y and G-Y color difference signals. These signals are coupled to a kinescope driver unit (not shown) where they are matrixed with luminance (Y) signals conventionally derived from the video signal to produce red (R), blue (B) and green (G) color signals for driving the kinescope.

Burst gate circuit 50 comprises a common emitter NPN transistor 60 biased to exhibit saturated conduction under quiescent conditions. A resistor 61 represents a collector load for transistor 60 together with the effective input impedance of unit 70, and a resistor 56 provides base bias for transistor 60. Separated positive horizontal sync pulses ($V_s$) from unit 30 are supplied to the base input of transistor 60 via a differentiating network comprising resistors 52, 56 and a capacitor 58. As will be discussed, the timing and duration of the burst gate pulse ultimately produced at the collector output of transistor 60 are primarily determined by the coaction of resistors 52, 56 and capacitor 58.

Before discussing the operation of circuit 50, reference is made to the video signal waveform of FIG. 1a, which illustrates the relative positions of the horizontal sync pulse component and the burst component in the video signal. The video signal comprises an image interval $T_I$ following an image blanking interval $T_B$. The blanking interval (of the order of ten microseconds) recurs at the horizontal line scanning rate, and includes a sync interval $T_s$ and a burst interval $T_b$. Sync interval $T_s$ contains a negative-going horizontal sync pulse, followed by burst interval $T_b$ containing several (e.g., ten) cycles of continuous wave subcarrier burst signal.

With reference to the following description, FIG. 1b depicts the waveform of sync pulse $V_s$, FIG. 1c depicts the waveform of a voltage $V_B$ developed at the base of transistor 60, and FIG. 1d depicts the waveform of a burst gate pulse $V_o$ developed at the collector output of transistor 60.

Under quiescent conditions (i.e., before sync pulse $V_s$ appears), transistor 60 is biased to conduct heavily in a saturated state. At this time the output collector potential $V_o$ of transistor 60 (approximately 0.2 to 0.3 volts) closely approaches the emitter potential (i.e., ground potential). The positive-going amplitude portion of the sync pulse occurring prior to a time $T_O$ and as coupled via differentiator 52, 56, 58 is in a direction to cause transistor 60 to conduct. However, since transistor 60 is saturated at this time, the positive-going amplitude portion of sync pulse $V_s$ has substantially no effect on the conduction of transistor 60. Also at this time, the base of transistor 60 is clamped to a positive voltage $V_{BE}$ (i.e., 0.7 volts corresponding to the base-emitter junction voltage drop of transistor 60), as shown in FIG. 1c.

The negative-going amplitude transition of sync pulse $V_s$ occurs at time $T_O$ and causes transistor 60 to come out of saturation for a time primarily determined by a time constant associated with resistors 52, 56 and capacitor 58, in the following manner.

The negative-going amplitude transition of the sync pulse as coupled via differentiator 52, 56, 58 causes a negative-going voltage transition to appear at the base of transistor 60 at time $T_0$ (FIG. 1c). It is noted that the amplitude of sync pulse $V_s$ is chosen sufficiently large so that this negative-going transition exceeds the reverse breakdown voltage $V_{BE(REV)}$ (e.g., 5.6 volts) of the base-emitter junction of transistor 60. The peak negative amplitude of this transition then appearing at the base of transistor 60 at time $T_0$ is limited to the level of this reverse breakdown voltage. Transistor 60 turns off in response to this negative transition, causing the collector output voltage ($V_o$) to rise quickly in a positive direction commencing at time $T_0$ substantially coincident with the end of the sync interval and the beginning of the burst interval, as shown in FIG. 1d.

Collector voltage $V_o$ of transistor 60 remains at a positive level $+V_o$ until a later time $T_1$, when transistor 60 reverts to the saturated state. This positive level is given by the expression:

$$\left( \frac{R_L}{R_L + R_{61}} \right) \times (+12 \text{ volts})$$

where $R_L$ is the effective impedance presented to the collector of transistor 60 from unit 70 (e.g., five kilohms), and $R_{61}$ is the value of resistor 61. The saturated state is again reached when capacitor 58 charges to a positive level, via resistors 52 and 56, sufficient to forward bias the base-emitter junction of transistor 60 at time $T_1$. Transistor 60 then conducts heavily, whereby the collector output voltage $V_o$ rapidly decreases to the quiescent level of approximately ground potential at time $T_1$.

The duration, or width, of burst gate pulse $V_o$ produced when transistor 60 is cut-off during interval $T_0$–$T_1$ is proportional to a time constant defined by the product of the value of capacitor 58 and the sum of the values of resistors 52 and 56. In this example, a burst gate pulse width of approximately 3.80 microseconds is produced.

In this manner the pulse waveform $V_o$ produced at the collector of transistor 60 during interval $T_0$–$T_1$ corresponds to an appropriately delayed sync pulse which substantially coincides with the burst interval.

As noted previously, the circuit is arranged so that the negative-going amplitude transition of sync pulse $V_s$ occurring at time $T_0$ cause the reverse base-emitter breakdown voltage $V_{BE(REV)}$ of transistor 60 to be exceeded. This voltage is an inherent transistor characteristic which is readily controlled and predictable. Operation in this manner enhances the predictability and accuracy of the timing of output burst gate pulse $V_o$ with respect to normally expected variations in the base-emitter voltage ($V_{BE}$) of transistor 60 and variations in the level of the input sync pulse, since the reverse breakdown voltage establishes a predictable level at the base of transistor 60 from which capacitor 58 is charged in a positive direction via resistor 56 from time T₀ to time T₁.

As seen from FIG. 1c, the base voltage $V_B$ of transistor 60 is clamped to a level $V_{BE}$ corresponding to the base-emitter voltage drop of transistor 60 at times other than the burst interval $T_0-T_1$. The base-emitter voltage of transistor 60 can vary undesirably (e.g., due to temperature changes) by an amount sufficient to upset the timing (i.e., duration) of the output burst gate pulse. If, as in this case, the difference between the level $V_{BE}$ (0.7 volts) and the reverse base-emitter breakdown voltage of transistor 60 (e.g., 5.6 volts) is significant compared to normally expected $V_{BE}$ variations, these variations will have an insignificant effect upon the burst gate pulse width.

If the base-emitter junction of transistor 60 is not forced into the reverse breakdown mode, the duration of the burst gate pulse would then exhibit a greater dependence on the amplitude of the input sync pulse. However, when the amplitude of the sync pulse causes the base-emitter reverse breakdown voltage to be exceeded by a sufficient amount, as in this example, burst gate duration is largely independent of normally expected sync pulse amplitude variations, and instead is more a function of the relatively predictable reverse breakdown voltage.

The described burst gate circuit requires relatively few readily available components, and is uncomplicated and inexpensive. In addition, suitably accurate, predictable and noise-immune performance is provided.

It is noted that the negative-going edge of the burst gate pulse at time $T_1$ is produced by transistor 60 going into saturation. This edge exhibits a well-defined and rapid decay time such that exponential decay of long duration is minimized. Therefore, the likelihood of gating image information occurring after time $T_1$ is substantially reduced.

The amplitude of the burst gate pulse is also well-defined and predictable, since the conduction of transistor 60 varies between saturation and cut-off. In a related feature of this circuit, it is noted that the positive-going input sync pulse produces a positive-going burst gate pulse (i.e., non-inverting operation). This result is advantageous in a system having available a positive separated sync pulse, and which requires a positive polarity burst gate pulse. Both of these features are provided without requiring additional circuits such as inverters or clamps to modify the output pulse, as is common in many known types of burst gate circuits.

Also, the described circuit has been found to be substantially insensitive to normally expected variations in sync amplitude caused by operating supply variations and aircraft "flutter," for example.

Burst gate timing variations from receiver to receiver as a function of component tolerances have been found to be within acceptable limits when five percent tolerance values were used for resistors 52 and 56, and ten percent tolerance values were used for capacitor 58. In this instance worst case tolerance variations of these timing elements produced an acceptable burst gate pulse width variation of from 3.25 microseconds to 4.40 microseconds.

Alternate circuit embodiments of the present invention which also exhibit the features discussed above are shown in FIGS. 2 and 3.

In FIG. 2, a PNP transistor 260 is employed in a circuit for generating a negative-going burst gate pulse $V_o$ (FIG. 2c) in response to a negative-going input sync pulse $V_s$ (FIG. 2a). Resistors 252, 256 and 261 and capacitor 258 perform the same function as resistors 52, 56 and 61 and capacitor 58 in the circuit of FIG. 1, respectively, and transistor 260 operates in the same fashion as transistor 60 of FIG. 1.

The voltage $V_B$ developed at the base of transistor 260 is shown in FIG. 2b. The positive peak amplitude $(+V_B)$ of this waveform occurring at time $T_0$ is equal to the level of the operating supply $(+V)$ plus the reverse base-emitter breakdown voltage of transistor 260, while the amplitude of this waveform for times other than during interval $T_0-T_1$ is equal to the level of the operating supply $(+V)$ less the base-emitter voltage drop $(V_{BE})$ of transistor 260. The positive peak amplitude $(+V_o)$ of burst gate pulse $V_o$ (FIG. 2c) is equal to the level of the operating supply $(+V)$, less the saturated collector voltage of transistor 260 (approximately a few tenths of a volt).

In FIG. 3, a NPN transistor 360 is arranged in grounded base configuration for generating a negative-going burst gate pulse $V_o$ in response to a positive-going input sync pulse (FIG. 1b). In this example, the input synch pulse $V_s$ is applied to an emitter of transistor 360 via a timing network comprising a differentiating capacitor 358 and a resistor 352 arranged in the emitter circuit of transistor 360. A load resistor 361 is coupled between the collector of transistor 360 and a direct current operating supply $+V$.

A burst gate pulse $V_o$ developed at the collector output of transistor 360 exhibits a peak amplitude during interval $T_0-T_1$ equal to the saturated collector voltage of transistor 360. At other times the collector voltage of transistor 360 is defined by the expression:

$$\left( \frac{R_L}{R_L + R_{361}} \right) \times (+V)$$

where $+V$ is the level of the operating supply, $R_{361}$ is the value of resistor 361 and $R_L$ is the effective impedance presented to the collector of transistor 360 from unit 70 (FIG. 1).

Although the circuits herein have been described as being triggered by an input sync pulse derived directly from the video signal, these circuits can also be triggered by a pulse derived from a horizontal flyback pulse produced by horizontal deflection circuits of the receiver. However, use of the sync pulse to generate the burst gate pulse is preferred in many situations for the reasons pointed out earlier.

What is claimed is:

1. Apparatus for generating a burst gate pulse suitable for use in processing color information contained in a chrominance component of a color television video signal also having a horizontal synchronizing component and a color reference burst component occurring during a burst interval, said apparatus comprising:
   source means for providing a periodic reference pulse representative of said horizontal synchronizing component;
   an active semiconductor current conducting device having input, output and common electrodes, said device having a semiconductor PN junction between said input and common electrodes, said active device being biased to conduct under quiescent conditions; and signal translating means coupled to said source means and to said input electrode for producing a translated reference pulse at said input electrode, said translated pulse exhibiting in response to the trailing edge of said reference pulse an amplitude transition of a sense and magnitude sufficient to cause reverse breakdown of said PN junction and to render said active device nonconducting for a duration determined by said signal translating means, to thereby produce at said output electrode a gate pulse delayed relative to said reference pulse and substantially coincident with said burst interval.

2. Apparatus according to claim 1, wherein:
said signal translating means exhibits a given time constant; and
said amplitude transition substantially coincides with the beginning of said burst interval.

3. Apparatus according to claim 2, wherein:
said signal translating means comprises a differentiating circuit.

4. Apparatus according to claim 1, wherein:
said active device comprises a transistor having a base input electrode, a common emitter electrode, and a collector output electrode; and
said PN junction corresponds to the base-emitter junction of said transistor.

5. Apparatus according to claim 4, wherein:
said active device is saturated under quiescent conditions.

6. Apparatus according to claim 4, wherein:
said base electrode is coupled to said signal translating means for receiving said translated pulse;
said emitter electrode is coupled to a point of operating potential; and
said collector is coupled to a point of operating potential through an impedance, whereby delayed output gate pulses provided at said collector electrode and said reference pulses are of the same relative polarity.

7. Apparatus according to claim 6, wherein:
said signal translating means comprises a first resistance and a capacitance arranged in series between said source means and said base electrode, and a second resistance coupled between a voltage source and a terminal of said capacitance remote from said source means; and
said impedance comprises a third resistance.

8. Apparatus according to claim 1, wherein:
said active device comprises a transistor having an emitter input electrode coupled to said signal translating means for receiving said translated pulse, a base electrode coupled to a point of operating potential, and an output collector electrode coupled to a point of operating potential through an impedance, such that delayed output gate pulses provided at said collector electrode and said reference pulses are of mutually opposite polarity.

9. Apparatus according to claim 8, wherein:
said signal translating means comprises a resistance coupled between said emitter electrode and a point of operating potential, and a capacitance coupled to said emitter electrode.

10. Apparatus according to claim 1 and further comprising:
means responsive to said color television signal and to said gate pulse for separating said chrominance and burst components.

11. A circuit for generating an output pulse in response to an input reference pulse, comprising:
source means for providing a recurring reference pulse;
an active semiconductor current conducting device having input, output and common electrodes, said device having a semiconductor PN junction between said input and common electrodes, said active device being biased to a conductive state under quiescent conditions; and
a signal translating means having a given time constant coupled to said source means and to said input electrode for producing a translated reference pulse at said input electrode, said translated pulse exhibiting an amplitude transition of a sense and magnitude such as to cause reverse breakdown of said PN junction and to render said active device nonconducting for a duration determined by said time constant.

12. A circuit according to claim 11, wherein:
said active device is biased to a saturated state under quiescent conditions.

13. A circuit according to claim 11, wherein:
said translated reference pulse exhibits said amplitude transition of said sense and magnitude in response to the trailing edge of said reference pulse.

* * * * *